United States Patent [11] 3,567,862

[72] Inventors Peter Swift Carnt
Herrliberg;
Theodore Ernest Bart, Zurich, Switzerland
[21] Appl. No. 706,463
[22] Filed Feb. 19, 1968
[45] Patented Mar. 2, 1971
[73] Assignee RCA Corporation
[32] Priority Feb. 24, 1967
[33] Great Britain
[31] 8835/67

[54] MONITORING OF PAL SIGNAL WAVEFORMS
6 Claims, 7 Drawing Figs.

[52] U.S. Cl. .......... 178/5.4, 178/69.5
[51] Int. Cl. .......... H04n 7/02
[50] Field of Search .......... 178/5.4, 5.4 (P), 5.4 (Test), 6 (TT), 7.5 (D), 69.5 (TV); 328/152, 187, 188, 189; 324/78, 88

[56] References Cited

UNITED STATES PATENTS
3,424,867 1/1969 Monnier .......... 178/69.5TV

OTHER REFERENCES
" Multichannel Switch For Biological Observations" by Robert W. Woods in Electronics December 1955 pages 135—137

*Primary Examiner*—Richard Murray
*Assistant Examiner*—George G. Stellar
*Attorneys*—Eugene M. Whitacre and William H. Meagher

ABSTRACT: Apparatus and methods for the selective identification and display of four unique fields in the PAL system. Trigger pulses are generated to enable selective display by a waveform monitor of the vertical blanking interval waveforms of any desired field in the four field sequence. Pursuant to a first embodiment, particularly useful where there is available from equipment being monitored (half line frequency) master binary output keyed to the burst phase alternation as well as sync pulse outputs, the trigger pulse generation is achieved by apparatus including coincidence circuits responding to sync signals and master binary waveforms. In accordance with a further embodiment, of more universal applicability, the trigger pulse generating apparatus requires only a composite video signal input. In the latter embodiment, facilities are provided for simultaneously displaying the four unique vertical interval waveforms, one above the other, in a predetermined position sequence. The latter embodiment further provides facilities for determining the field phase coincidence of differently sourced PAL signals.

INVENTORS
PETER S. CARNT &
THEODORE E. BART
BY William H. Meagher
ATTORNEY

INVENTORS
PETER S. CARNT &
THEODORE E. BART
BY William H. Meagher
ATTORNEY

INVENTORS
PETER S. CARNT &
THEODORE E. BART
BY William H. Meagher
ATTORNEY

INVENTORS
PETER S. CARNT &
THEODORE E. BART
BY William H. Meagher
ATTORNEY

INVENTORS
PETER S. CARNT &
THEODORE E. BART
BY William H. Meagher
ATTORNEY

INVENTORS
PETER S. CARNT &
THEODORE E. BART
BY William H. Meagher
ATTORNEY

MONITORING OF PAL SIGNAL WAVEFORMS

The present invention relates to apparatus for, and methods of, providing selective identification and display of the four unique fields in a PAL color television system.

In accordance with the signal standards of the PAL color television system, the blanking of the color synchronizing burst in the vicinity of the field sync interval follows a pattern which repeats only after four successive fields. If a cathode-ray oscilloscope (C.R.O.) display is triggered at field rate for monitoring of the pertinent interval of the PAL signal waveform, the four fields are superimposed; even if the C.R.O. is triggered at frame rate, two superimposed fields are seen. It follows that this superimposition of successive fields (of differing character) makes the detailed examination of the waveform in the vicinity of the field sync interval very difficult or impossible. A major purpose of this invention is to provide apparatus and methods allowing a detailed examination of the PAL waveform in the vicinity of the field sync interval.

Where the apparatus providing the PAL signal waveform to be monitored also conveniently provides sync pulse outputs as well as a half line frequency master binary output (related to the line-by-line switching of the synchronizing burst phase), trigger pulse generation is readily achieved in accordance with the principles of a first embodiment of the present invention, relying on relationships between the sync pulse and master binary waveforms peculiar to particular fields. Switch selection of particular combinations of sync pulse responsive signals and master binary wave responsive signals enables selective generation of trigger pulses for initiating the display of any particular one of the fields in the four-field sequence.

In accordance with a further embodiment of the present invention, similar facilities may be provided in an arrangement requiring as an input only the composite video signal waveform to be monitored. In accordance with this embodiment, identification of particular fields is developed by apparatus and techniques relying on the distinctive make up of the composite video signal during particular ones of the fields in the four-field sequence. Pursuant to this embodiment, the field phase coincidence of differently sourced PAL signals may be determined. Apparatus and techniques are additionally provided for effecting the internal generation of a stairstep waveform to permit the four unique vertical blanking interval waveforms to be simultaneously displayed one above the other in a predetermined position sequence.

A primary object of the present invention is to provide apparatus for, and methods of, selectively identifying and displaying the four unique fields of a PAL color television signal.

A further, particular object of the present invention is to provide apparatus for, and methods of, determining the field phase coincidence of differently sourced PAL signals.

Other objects and advantages of the present invention will be readily recognized by those skilled in the art upon a reading of the following detailed description and an inspection of the accompanying drawings in which.

Figure 3:
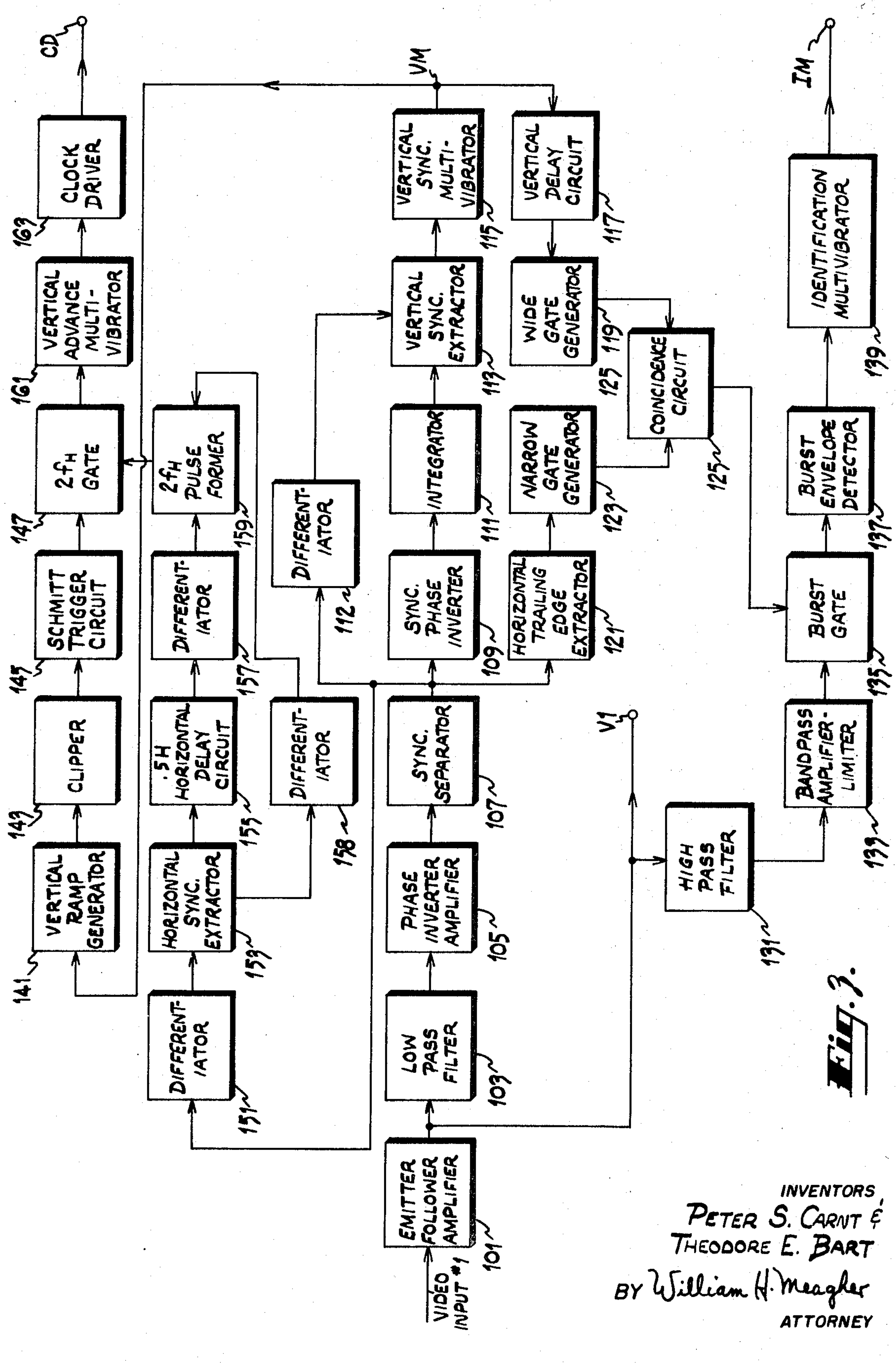
FIGS. 3 and 6 illustrate, with block representations of equipment, complementing segments of a monitoring arrangement in accordance with a second embodiment of the present invention, which requires only a composite video signal input.
Figure 4:
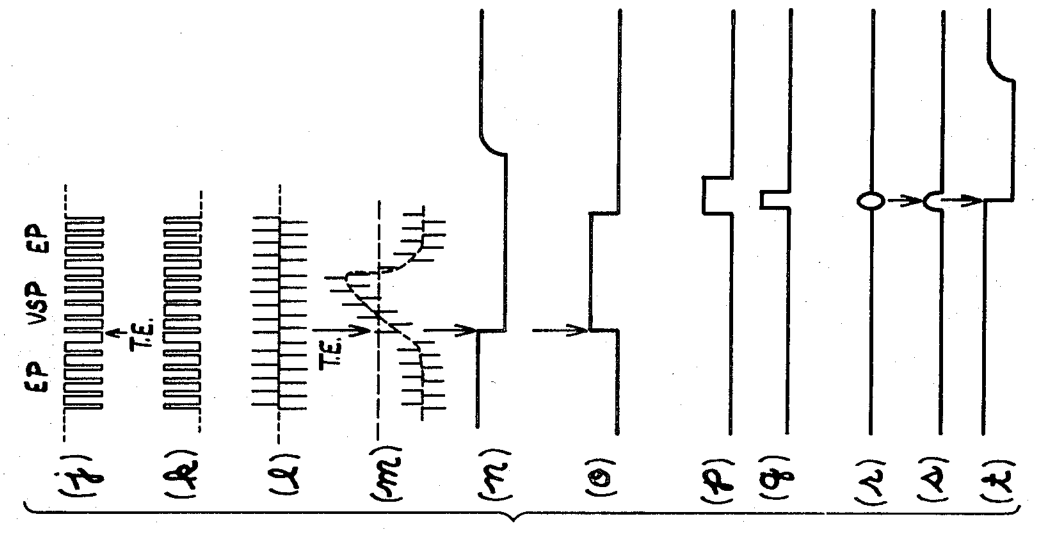
Figure 7:
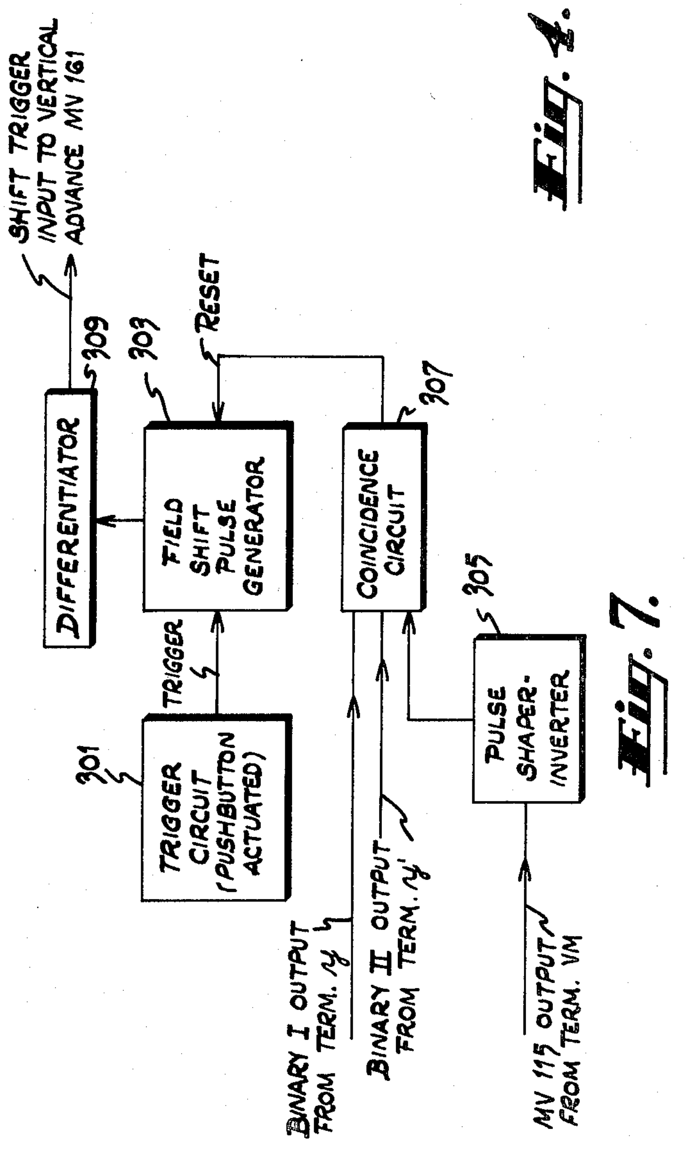
Figure 5:
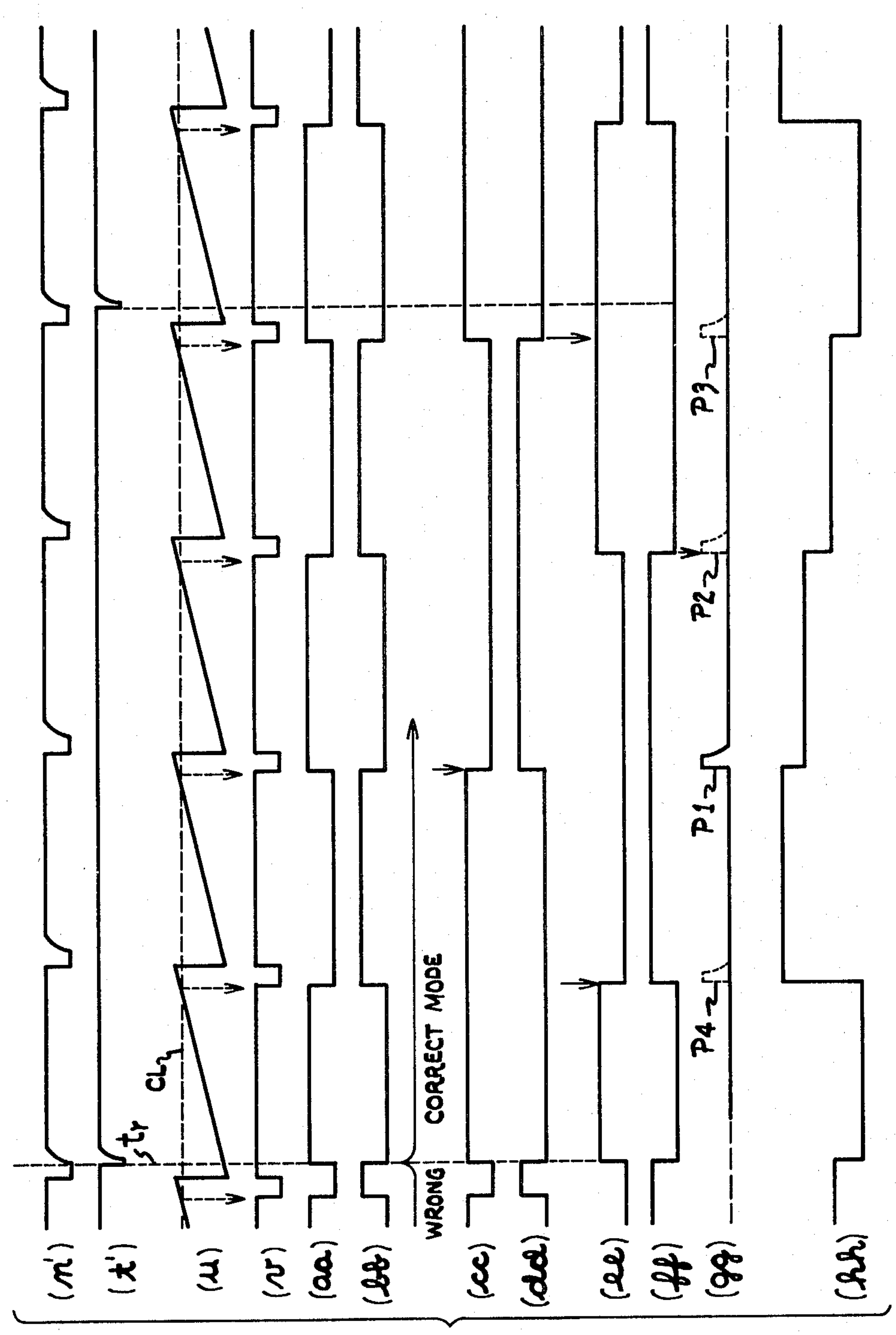
Figure 6:
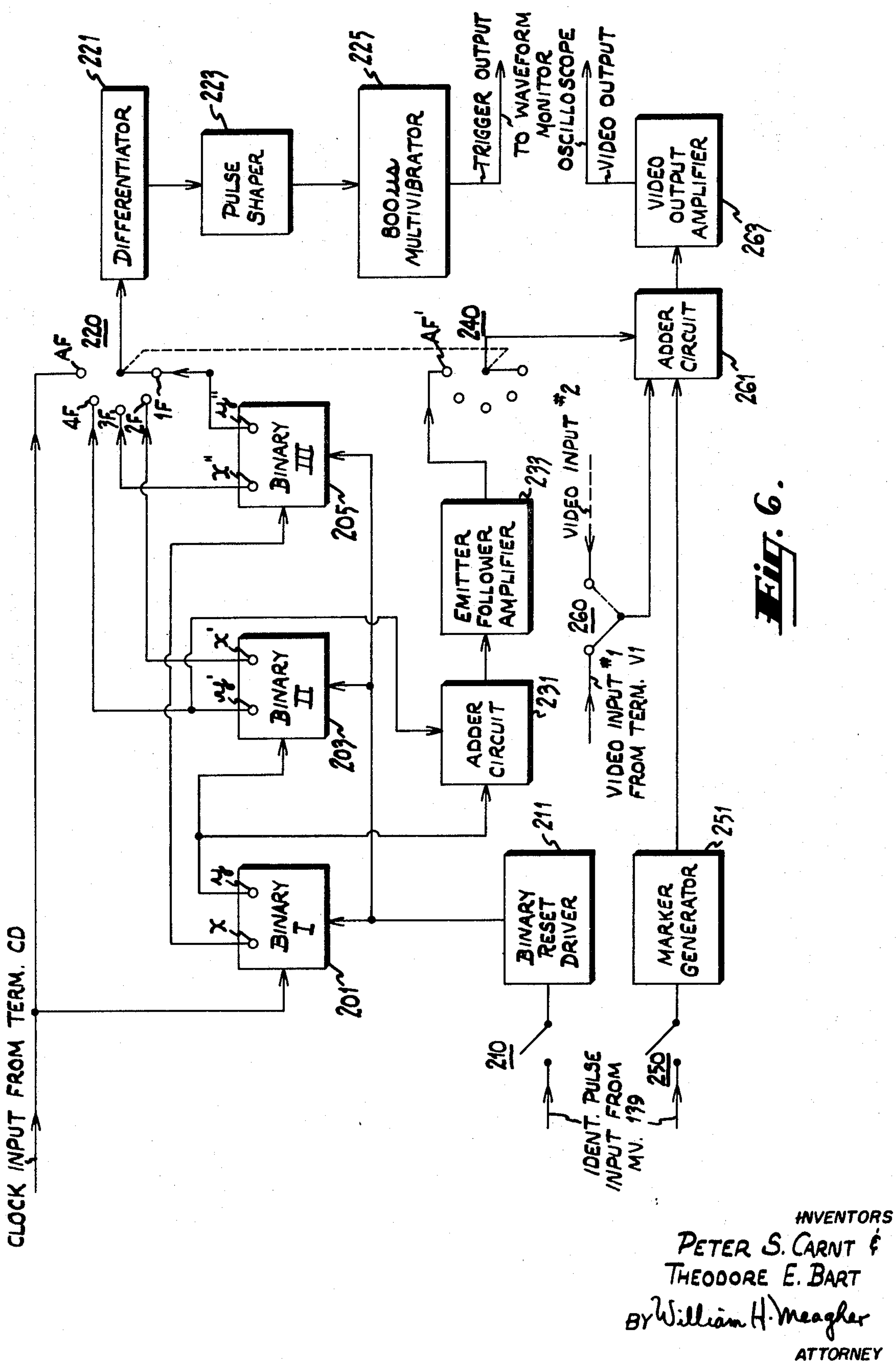

FIGS. 4 and 5 illustrate graphically signal waveforms of aid in explaining the operation of apparatus of FIGS. 3 and 6; and FIG. 7 illustrates, with block representations of equipment, auxiliary apparatus for use in combination with the apparatus of FIGS. 3 and 6 in accordance with a modification of the second embodiment of the invention.

The vertical blanking intervals of the four distinct PAL fields are shown in FIG. 1*a*, *b*, *c* and (d). Small arrows in the horizontal sync backporch region are employed to indicate the presence of a color synchronizing burst; the alternating arrow directions reflect the burst phase variation of the PAL system, with an upward direction designating a burst phase of 135° and a downward direction designating a burst phase of 225°. FIG. 1*e* to *h* show the waveforms of a half-line frequency master binary output related to the burst phase alternation for the respective PAL fields one to four. Thus, FIG. 1*e* shows the phase of the binary for the FIG. 1*a* field, where it will be seen that a positive state of the binary output wave corresponding to a burst phase of 135°, while a negative state corresponds to a burst phase of 225°.

Figure 2:
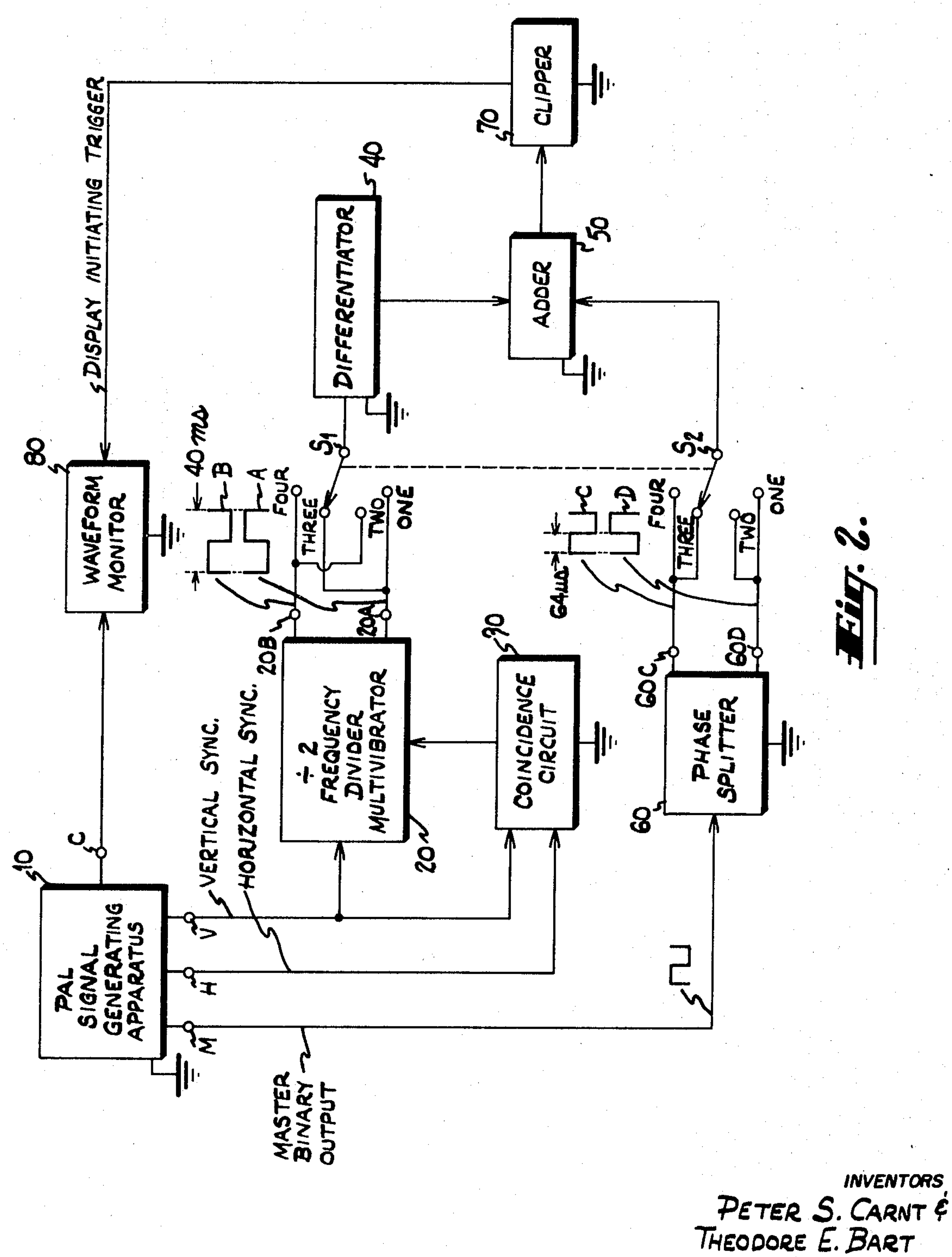
FIG. 2 illustrates, using block representations of equipment, a waveform monitoring arrangement in accordance with said first embodiment of the present invention.

Consider now the block diagram shown in FIG. 2. The PAL signal generating apparatus to be monitored (which may, for example, be a PAL tape recorder) is represented by the block designated 10. A vertical sync (50 Hz.) output of apparatus 10, available at terminal V, is fed to a divide-by-two binary (frequency divider multivibrator 20) from which is taken two oppositely phased 25 Hz. square wave outputs (waveform A at output terminal 20A, and waveform B at output terminal 20B). In addition, a coincidence circuit 30 responding to vertical and horizontal sync outputs of apparatus 10 provides a setting pulse output to set the binary (multivibrator 20) in such a wave that, for example, the negative going edges of waveform A correspond to the start of fields one and three, while the negative going edges of waveform B correspond to the start of fields two and four. The waveform A or B is selectively fed via a four-position switch $S_1$ to a differentiating circuit 40, the differentiator output being supplied to an adder 50.

A master binary waveform, consisting of a square wave having a period of two lines (i.e. 128 μsec.) and appearing at output terminal M of the generating apparatus 10, is fed to a phase splitter stage 60 providing a pair of oppositely phased versions C and D of the 7812.5 Hz. square wave at the output terminals 60C and 60D. Either of these waveforms can be fed selectively via a second four-position switch $S_2$ (ganged to switch $S_1$) to the aforementioned adder 50. The output is fed to a clipper 70 from which a trigger-pulse-output is obtained.

Figure 1:
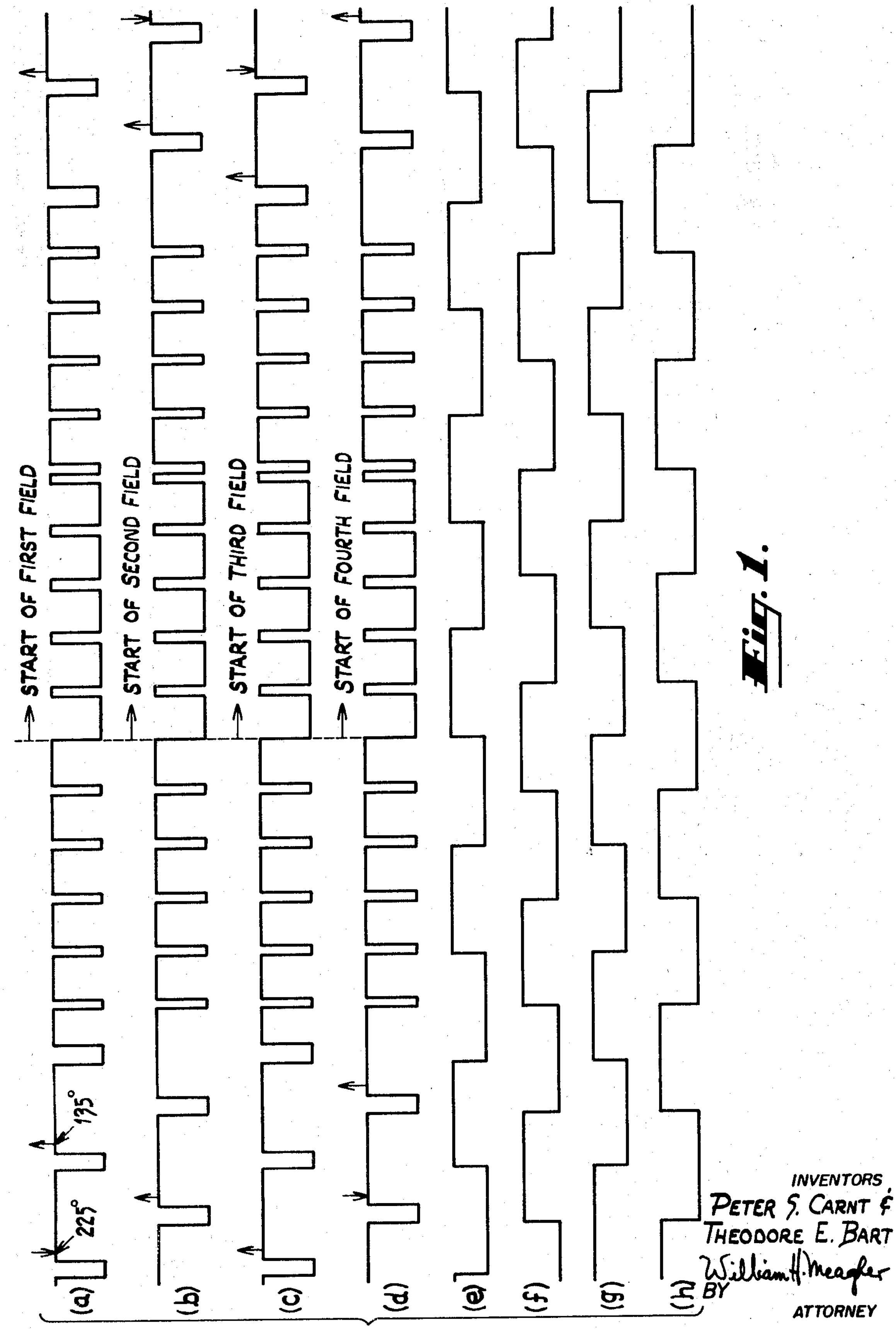
FIG. 1 illustrates graphically signal waveforms of aid in explaining the operation of a first embodiment of the present invention.

Suppose now that the switches $S_1$ and $S_2$ are in the positions shown (designated THREE) whereby waveforms A and C are selectively passed. Then the negative pulse corresponding to the differentiated negative pulse going edge of waveform A (corresponding to the start of fields one and three) will occur at the time represented by the dashed line shown in FIG. 1. The master binary waveforms for the start of the first and third fields (repeated without phase inversion as waveform C) will be as shown in FIG. 1*e* and 1*g*. Addition of the differentiated negative going edges of waveform A and 1*g* will give a greater amplitude (in the negative direction) than will addition of the differentiated negative edge waveform A and 1*e*. With the poling and threshold of the clipper 70 suitably adjusted for passing such negative peaks, a clipper output will result only when the negative edges of waveform A coincide with the negative bistable state of waveform 1*g*. Hence the resulting trigger pulse will correspond with the start of the third field. In contrast, with the switches in position ONE, selecting waveform A and waveform D (a phase inverted version of waveform C), the trigger output will correspond to the start of the first field.

Similarly, it can be seen that when the switches are in position TWO, selecting waveform B and waveform D, the trigger output will indicate the start of the second field, and, when the switches are in position FOUR, selecting waveform B and waveform C, the trigger output will indicate the start of the fourth field.

The trigger pulse output of clipper 70 is applied to the waveform monitor apparatus 80 to suitably control initiation of the display of only the selected field blanking intervals of the signal output of apparatus 10 that is to be monitored.

This embodiment of the invention finds useful application in conjunction with studio equipment for the PAL system, particularly in conjunction with sync generators and video tape machines.

While it may appear to be trivial that if, as the result of a fault condition, the blanking of the bursts during the field sync interval were not in accordance with the standard shown in FIG. 1*a* to *d*, in fact some equipment may rely on this standard to set the phase of the master binary. For example, the first burst to occur in any field should be of phase 135°, and this fact may be used to set the master bistable phase as positive at this time. Should a burst be accidentally allowed through immediately after the first horizontal sync pulse of fields one and four, for example, the master binary would be set in the wrong phase for two out of four fields. Hence, an incorrect blanking of the burst during the field sync interval may lead to a major picture defect, and it is clearly necessary to be able to monitor the burst waveform reliably during the field sync interval.

A more versatile embodiment of the present invention is disclosed in the complementary block diagrams of FIGS. 3 and 6; this second embodiment requires only a composite video signal input (in contrast with the sync pulse and master binary wave inputs used by the FIG. 2 apparatus), rendering readily feasible the monitoring of remotely originating PAL signals.

As previously observed, the array of bursts in the vicinity of the field sync interval for each of the four unique fields is shown by the waveforms of FIGS. 1*a*, 1*b*, 1*c* and 1*d*. It may be noted that the first and last bursts of any field always have the same 135° phase (so that the burst locked oscillator in a receiver suffers the least disturbance during the vertical interval). It should also be noted that the earliest possible PAL burst occurs in the third field (FIG. 1*c*) and its time delay with respect to the start of the vertical sync pulse is 5H (i.e., five line intervals); this fact is relied upon in identification of the individual fields in the composite video input embodiment now to be described.

The apparatus of FIG. 3 responds to a composite video signal input and generates two distinct pulse train outputs: a third field identification pulse output at terminal IM (recurring at a 12.5 Hz. rate), and an adjustably timed clock pulse output at terminal CD (recurring at the 50 Hz. field rate). These outputs, together with a repeated version of the composite video signal input from an output terminal V1, are utilized by the complementary apparatus of FIG. 6, to be subsequently described.

The composite video signal input (here designated video input 01) to the apparatus of FIG. 3 is applied via an emitter follower amplifier 101 to both a low pass filter 103 and a high pass filter 131. The low pass filter 103 supplies, via a phase inverter amplifier 105, the input to a sync separator 107, which, in accordance with conventional techniques, separates the deflection synchronizing components from the video portion of the composite signal. The composite sync output of separator 107 is illustrated by waveform *j* of FIG. 4.

For the purpose of precisely timed vertical sync extraction, the output of separator 107 is applied to both a sync phase inverter stage 109 and a differentiator 112. Waveform *k* of FIG. 4 illustrates the output of inverter 109, while waveform *l* of FIG. 4 illustrates the output of differentiator 112. An integrated version of waveform *k*, derived by integrator 111 from the inverter 109 output, is combined with the waveform *l* output of differentiator 112 to drive the vertical sync extractor 113. The combined driving waveform, illustrated by waveform *m* of FIG. 4, is related to an operating threshold of extractor 113 such that extractor 113 senses the first serration of the vertical sync pulse. In practice, the extractor may employ a transistor biased such that it remains nonconducting until the combined effect of a rising sawtooth (corresponding to the integrated vertical sync pulse) and a positive going pulse (corresponding to the differentiated trailing edge TE of the first segment of the serrated vertical sync pulse) drives the transistor input electrode above a cutoff bias level (indicated in FIG. 4*m* by the dotted line).

The output of extractor 113 is used to trigger a monostable multivibrator, designated the vertical sync multivibrator 113, to produce an output pulse having a leading edge coinciding in time with the trailing edge TE of the first segment of the serrated vertical sync pulse; this output pulse is illustrated by waveform *n* of FIG. 4.

As noted previously, the first burst in the third field of the PAL signal occurs at a time delayed relative to the start of the vertical sync pulse by a 5H interval; this corresponds to a 4.5H delay with respect to the trailing edge TE of he first segment of the serrated vertical sync pulse. Appropriate to reliance on this characteristic of the third field, the pulses of waveform *m* are applied to a wide gate generator 119 via a vertical delay circuit 117, which is adjusted to introduce a delay corresponding to a 4.5H interval. In practice, the delay circuit 117 may take the form of a so-called boxcar circuit, which develops a pulse of 4.5H width; i.e., a pulse having its leading edge corresponding in time to the leading edge of the waveform *n* pulse and its trailing edge occurring after a 4.5H interval. The wide gate generator 119 responds to the trailing edge of the pulse output of delay circuit 117 to produce a gating pulse having its leading edge occuring at the end of the 4.5H interval. Waveform *o* of FIG. 4 illustrates the pulse output of delay circuit 117, while waveform *p* of FIG. 4 illustrates the pulse output of wide gate generator 119.

The waveform *p* output of generator 119 is applied to a coincidence circuit 125. The other input to coincidence circuit 125 is supplied by a narrow gate generator 123, responding to the output of a horizontal trailing edge extractor 121. The extractor 121, responding to the output of sync separator 107, serves to develop pulses occuring in time coincidence with the trailing edges of the horizontal sync component of the received signal. These trailing edge pulses serve to trigger the narrow gate generator 123, which develops a train of narrow pulses corresponding in timing to the horizontal sync backporch locations of color synchronizing bursts.

Coincidence circuit 125 generates an output pulse whenever pulse inputs from generator 119 and 123 appear in time coincidence. As may be appreciated from a review of the waveforms of FIGS. 1*a* through *d*, such a coincidence will occur only once during the first field and once during the third field. During the third field occurrence, a color synchronizing burst will be present, whereas during the first field occurrence no color synchronizing burst will be present. Appropriate to reliance on this fact, the coincidence circuit output (illustrated by waveform *q* of FIG. 4) is used as a circuit pulse for a burst gate 135. Whenever the coincidence circuit 125 produces an output pulse, the normally disabled gate 135 is enabled to pass signals appearing in the output of a band-pass amplifier limiter 133, which is fed by the previously mentioned high pass filter 131. Whenever color synchronizing bursts are present in the input signal, they pass through the high pass filter 131 and are of the proper frequency to be amplified by the narrow band amplifier limiter 133 for delivery to the input of gate 135.

During the third field, a burst will be present at the input gate 135 when the coincidence circuit 125 generates its output pulse (waveform *q*), and the gate 135 will develop a burst output, as illustrated by waveform *r* of FIG. 4. A burst envelope detector 137 responds to the presence of this burst output of gate 135 to develop an output pulse, as illustrated by waveform *s* of FIG. 4. During the other times of enabling the gate 135, i.e., during a first field, there will be no burst present at the input of the enabled gate, and envelope detector 137 will produce no output pulse. The waveform *s* output of detector 137 thus comprises pulses which occur only once during each third field of each four-field sequence of the PAL signal input. The detector output pulse is used to trigger a monostable multivibrator, designated the identification multivibrator 139, to develop the third field identification pulse output at terminal IM; this output is illustrated by waveform *t* of FIG. 4.

It is now in order to consider those portions of the apparatus of FIG. 3 used to develop a clock pulse output. For this purpose, the output of the vertical sync multivibrator 115 (illustrated by waveform *n* of FIG. 4, and reillustrated on a larger time scale by waveform *n'* of FIG. 5) is fed to a vertical ramp generator 141. In practice, the ramp generator 141 may comprise a conventional sawtooth wave generator, incorporating means for adjusting the timing of the sawtooth, and preferably incorporating S-shaping feedback to accelerate the rate of rise toward the end of the ramp. The sawtooth wave output of ramp generator 131, illustrated by waveform *u* of FIG. 5 is fed via a clipper 143 to a Schmitt trigger circuit 145 to develop an enabling pulse for a gate circuit, designated a $2f_h$ gate 147. The clipper 143 passes only the final rising portion of the ramp waveform, with the clipping level being illustrated by the dashed line CL associated with waveform *u* of FIG. 5. The enabling of gate 147 by trigger circuit 145 thus begins when the ramp waveform rises above the clipping level CL.

A train of double line frequency $2f_h$ pulses is supplied to the $2f_h$ gate 147, the double line frequency pulses being developed in a manner to be described. The composite sync output of separator 107 is fed via a differentiator 151 to a horizontal sync extractor 153, developing outputs corresponding to the horizontal synchronizing component of the received signal, to the relative exclusion of the vertical synchronizing component thereof. A differentiated version of the horizontal sync-output of extractor 153 (derived by a differentiator 158) and a differentiated version of the horizontal sync pulses delayed by a .5H amount (as derived by differentiator 157 operating on the output of .5H horizontal delay circuit 155) are combined in the $2f_h$ pulse former 159 to provide the double line frequency pulse input to gate 147. In practice, the .5H delay circuit may comprise a so-called boxcar circuit, providing generation of pulses of .5H width.

The first of the $2f_h$ pulses delivered to gate 147 after its enabling by trigger circuit 145 is passed by the gate to trigger a monostable multivibrator, designated the vertical advance multivibrator 161. The pulse output of multivibrator 161 (illustrated by waveform *v* of FIG. 5) is shaped and phase inverted by a clock driver stage 163 and applied therefrom to the clock pulse output terminal CB.

In the apparatus of FIG. 6, use is made of the clock pulse and identification pulse outputs of the FIG. 3 apparatus. The structure includes a trio of bistable multivibrators 201, 203, and 205 (hereinafter referred to, respectively, as binary I, binary II and binary III), which may illustratively be in the form of integrated circuit flip-flops. The 50 Hz. clock pulse developed at terminal CD of the FIG. 3 apparatus is applied to binary I as a trigger input. Binary I responds to the positive-going excursion of each clock pulse by shifting states, developing in the process of pair of oppositely phased, 25 Hz. square wave outputs at the respective output terminals *x* and *y*. Waveform *aa* of FIG. 5 illustrates the 25 Hz. output waveform at terminal *x*, and waveform *bb* of FIG. 5 illustrates the oppositely phased 25 Hz. output wave at terminal *y*.

The output wave at terminal *y* is supplied as a trigger input to binary II while the output at terminal *x* is supplied as a trigger input to binary III. Each positive-going excursion of the trigger input to binary II causes it to shift states resulting in the development of respective, oppositely phased 12.5 Hz. square waves at the output terminals $x'$ and $y'$. Similarly, the differently timed positive-going excursions of the trigger input to binary III cause it to shift states, resulting in the development of respective oppositely phased 12.5 Hz. square waves at the output terminals $x''$ and $y''$. Waveforms *cc*, *dd*, *ee*, and *ff* illustrate the 12.5 Hz. square waves at the respective output terminals $x''$, $y''$, $x'$ and $y'$.

A selector switch 220 is provided with a single movable contact, and a plurality of fixed contacts 1F, 2F, 3F, 4F and AF. The 12.5 Hz. square wave developed at terminal $y''$ of binary III is supplied to fixed contact 1F, while the oppositely phased 12.5 Hz. square wave developed at terminal $x''$ of binary III is supplied to terminal 3F. The 12.5 Hz. square wave developed at output terminal $x'$ of binary II is supplied to the fixed contact 2F, while the oppositely phased 12.5 Hz. square wave developed at output terminal $y'$ of binary II is supplied to fixed contact 4F. Fixed contact AF receives the clock pulses developed at terminal CD of the FIG. 3 apparatus.

The movable contact of switch 220 is linked to the input of a differentiator 221. It will be noted when the movable contact of switch 220 is in contact with the fixed contact 1F (as illustrated in the drawing), the differentiator 221 will be supplied with a square wave which undergoes a positive excursion at the beginning of the first field; the differentiator 221 accordingly will develop a positive pulse at that point in time. The positive pulse output of differentiator 221, after suitable shaping in pulse shaper 223, is supplied as a trigger input to a monostable multivibrator (providing an output pulse of 800 microsecond duration in response to the triggering), the multivibrator being designated in the drawing as the 800 μsec. multivibrator 225. Waveform *gg* of FIG. 5 illustrates (in solid lines) the output of pulse shaper 223 for the illustrated IF positioning of switch 220, with the first-field trigger pulse designated as P1 in the drawing.

The output of multivibrator 225 serves as a trigger input to the oscilloscope of a waveform monitor. For the illustrated switch position, this triggering wave is suitable for effecting the display of the vertical blanking interval of the first field of the four-field sequence of the PAL signal. When selector switch 220 is rotated to the 2F position, the output at terminal $x'$ (waveform *ee*) provides the input to differentiator 221, with the result that the trigger pulse output of pulse shaper 223 occurs at the beginning of the second field (see dotted line pulse P2 of waveform *gg*). Similarly, at the 3F position, the $x''$ output (waveform *cc*) results in the production of a trigger pulse (dotted line pulse P3) at the beginning of the third field; while, at the 4F position, the $y'$ output (waveform *ff*) results in the production of a trigger pulse (waveform *ff*) results in the production of a trigger pulse (dotted line pulse P4) at the beginning of the fourth field.

Wen the selector switch 220 is rotated to the AF position, differentiator 221 will respond to a clock pulse at the beginning of each field, resulting in the production of an output from multivibrator 225 which enables the display of the vertical blanking interval of all the fields of the four-field sequence of the PAL signal.

In order that the displays of blanking interval of the four fields will not be superimposed when selector switch 220 is in the AF position, a stairstep wave is developed for addition to the video signal input to the waveform monitor oscilloscope, whereby the four waveforms may be displayed one above the other. An appropriate stairstep waveform is formed in an adder circuit 231 by combining a 25 Hz. square wave output of binary I (from terminal *y*) with a 12.5 Hz. output of binary II (from terminal $y'$ ) in the ratio of 1:2. Such combination of binary output waves produces a stairstep wave, in which the highest step occurs during the fourth field, and successively lower steps occur, respectively, during the first, second and third fields. This stairstep wave output of adder circuit 231 is illustrated by waveform *hh* of FIG. 5.

An emitter follower amplifier 233 supplies the stairstep wave to the fixed contact AF′ of a selector switch 240, ganged for rotation with selector switch 220. The movable contact of switch 240 is in contact with AF′ when selector switch 220 is in the AF position, and in such circumstance the stairstep wave is conveyed to an adder circuit 261 for combination with the composite video signal to be observed. Where observation and analysis of a single PAL signal is involved, the composite video signal to be observed will be the same signal (i.e., video output 0 1) as is supplied to filters 103 131 for the previously described pulse generations; the video input 01 is derived from the output (terminal V1) of the emitter follower amplifier 101 of FIG. 3 and conveyed via a switch 260 to the adder circuit 261. Switch 260 is illustrated as a single-pole, double-throw switch which, when thrown in the position indicated by a solid line in the drawing, connects the adder circuit input to terminal V1. When comparison between two PAL signals from different sources is desired, switch 260 may be thrown to its dotted line position, whereby a second PAL signal (video input 02) may be substituted for video input 01 as the signal to be observed, while video input 01 remains in control of binary triggering.

An additional, optional input to adder circuit 261 is the output of a marker generator 251, which may be operated, if desired, by closing a switch 250 to supply an identification pulse input from the identification multivibrator 139 of FIG. 3 to the generator 251. When rendered operative by the closing of switch 250, the marker generator 251 develops a marker pulse at the beginning of each third field in response to each third field identification pulse appearance to add a positive identification of the third field of each four-field PAL sequence to the waveform display.

Adder circuit 261 is preferably arranged so that, whenever a stairstep wave is added to the video input (by movement of switch 240 to the AF′ position), a suitable attenuation of the video input (as by loading down a video input stage) is effected to avoid excessive video waveform amplitude on the monitor display when the four fields are displayed simultaneously. The output of adder circuit 261 is fed to a video output amplifier 263, which supplies the video input to the waveform monitor oscilloscope.

An output of the identification multivibrator 139 of the FIG. 3 apparatus is conveyed via a normally closed switch 210 to a binary reset driver 211. The output of reset driver 211 is a negative-going reset pulse (illustrated by waveform *t′* of FIG. 5), corresponding in timing and polarity to the third field identification pulse illustrated as waveform *t* in FIG. 4. The reset driver output is applied to each of the binaries (201, 203 and 205) to reset them in the proper mode, if they are not already in the proper mode. As will be noted from a review of waveforms *bb, dd*, and *ff*, in the third field of the correct mode of operation of the binaries is such that the outputs thereof at the respective terminals *y, y′* and *y″* should be negative relative to the outputs thereof at the respective terminals *x, x′* and *x″*. The negative reset pulse shifts the binaries to this mode if they are in the wrong mode at the time of its appearance in the third field; this action is illustrated in FIG. 5 at time $t_r$. However, when the binaries are already switching in the correct mode when the reset pulse appears, no shifting is effected; this circumstance is illustrated in FIG. 5 in connection with the next succeeding reset pulse after $t_r$.

When an externally sourced PAL signal (video input 02 is to be examined for comparison with video input 01 (e.g., for determining field phase coincidence), it may be required to manually advance the display sequence. For such purposes, switch 210 is opened, eliminating the application of reset pulses to the binaries 201, 203 and 204. The binaries are still triggered by the clock pulse input from terminal CD, but can be of random phase. Field advance is then obtained by adding an additional trigger pulse between two succeeding clock pulses.

Apparatus for achieving this manual field shift effect, if desired, is illustrated in FIG. 7. The FIG. 7 apparatus includes a pushbutton actuated trigger circuit 301, which develops a single trigger pulse whenever the activating pushbutton is manually operated. The triggered pulse output of trigger circuit 301 is used to initiate the generation of a field shift pulse by a field shift pulse generator 303, which takes the form of a bistable multivibrator (and, illustratively, may be of the same construction as the binaries 201, 203 and 205). The generator 303 is reset to its initial state by the output of a coincidence circuit 307, which develops an output pulse upon the coincident appearance of positive inputs from three sources: (1) the binary I output from terminal *y;* (2) the binary II output from terminal *y′*; and (3) a shaped and phase inverted version of the output of vertical sync multivibrator 115, the multivibrator output at terminal VM (waveform *n′* ) being processed for this purpose by the pulse shaper-inverter 305.

Review of the waveforms *bb* and *ff* will reveal that the binary outputs at terminals *y* and *y′* are simultaneously positive only during the fourth field of the PAL signal sequence. The positive-going edge of the inverted VM pulse will complete the required coincidence during a fourth field display period, at a time subsequent to normal clock pulse initiation.

The output of the field shift pulse generator 303 is applied to a differentiator 309, which develops a negative shift trigger pulse in response to the trailing edge of the generated field shift pulse. This negative trigger output of differentiator 309 is conveyed as an auxiliary trigger input to the vertical advance multivibrator 161, to cause the introduction of an extra binary triggering pulse between the times of occurrence of two normally generated clock pulses. By making the shift trigger development responsive to the subsequent reset of generator 303, rather than to its manual triggering, one ensures that the shift trigger development does not overlap with the normal clock pulse generation (since, in the case of an overlap, no shift would occur).

Where it is desired to vary the precise vertical interval portion displayed by the waveform monitor, this may be readily effected by control of the ramp timing in the vertical ramp generator 141. However, since the vertical advance multivibrator 161 is actually triggered by a $2f_h$ pulse passed by the ramp-enabled gate 147, it should be recognized that as the advance is varied by adjustment of ramp timing, the display shifts in half line increments, giving a display stability equal to that of the incoming line sync.

We claim:

1. In processing color television signals of the PAL type, the synchronizing and blanking components of said PAL signals being such that successive field intervals of said signals differ in accordance with a repeating four-field sequence, each field interval in said four-field sequence being distinguishable from the other three thereof, a method of monitoring the waveform of said signals comprising the steps of:
   - developing a plurality of signals having characteristics which differ from different fields in said four-field sequence;
   - selectively passing one of said plurality of developed signals;
   - controlling the actuation of a trigger pulse generator with the selectively passed signal so that trigger pulse generation is restricted to association with only a selected one of the fields in each four-field sequence; and
   - using said triggering pulse to waveform a waveform display.

2. In apparatus for monitoring the waveform of the output of a source of color television signals of the PAL type, the synchronizing and blanking components of said PAL signals being such that successive field intervals of said signals differ in accordance with a repeating four-field sequence, each field interval in said four-field sequence being distinguishable from the other three thereof, control apparatus comprising the combination of:
   - means coupled to said signal course source for developing signals having characteristics which differ for different fields in said four-field sequence;
   - means subject to actuation by an output of said signal developing means for generating a trigger pulse timed to occur just prior to the beginning of a field interval;
   - a switch; and
   - means for utilizing said switch to selectively control the actuation of said trigger pulse generating means by said developed signals in such manner that said trigger pulse generation is restricted to association with only a selected one of the fields in each four-field sequence.

3. Control apparatus for use in monitoring the waveform of the output of a source of color television signals of the PAL type, the synchronizing and blanking components of said PAL signals being such that successive field intervals of said signals differ in accordance with a repeating four-field sequence, said control apparatus comprising the combination of:
   - means responsive to said PAL signals for developing a first pair of oppositely-phased square waves having a frequency corresponding to one-fourth the field frequency of said PAL signals;
   - means responsive to said PAL signals for developing a second pair of oppositely phased square waves also having a frequency corresponding to one-fourth the field frequency of said PAL signals, each wave of said second pair being effectively shifted in phase by one field interval relative to a corresponding one of said first pair;
   - a switch;
   - a trigger pulse generator; and means establishing control of the actuation of said trigger pulse generator by a selected one of said square waves so that said trigger pulse generation is restricted to association with only a selected one of the fields in each four-field sequence.

4. Control apparatus for use in conjunction with a waveform display devise to monitor the waveform of the output of a source of color television signals of the PAL type, the synchronizing and blanking components of said PAL signals being such that successive field intervals of said signals differ in accordance with a repeating four-field sequence, said control apparatus comprising the combination of:

means responsive to synchronizing components of said PAL signals for developing a first pair of oppositely-phased square waves having a frequency corresponding to one-fourth the field frequency of said PAL signals;

means responsive to synchronizing components of said PAL signals for developing a second pair of oppositely phased square waves also having a frequency corresponding to one-fourth the field frequency of said PAL signals, each wave of said second pair being effectively shifted in phase by one field interval relative to a corresponding one of said first pair;

means responsive to signal characteristics unique to a particular one of the fields of said four-field sequence for detecting the occurrence of each field interval in said PAL signals exhibiting said unique signal characteristics;

means responsive to the output of said detecting means for determining the sense of the developed square waves of said first and second pair;

a trigger pulse generator;

manual selective means for controlling the actuation of said trigger pulse generator in accordance with any selected one of said square waves to restrict said trigger pulse generation to association with any selected one of the fields in each four-field sequence; and means for applying said trigger pulse to said device to selectively establish a waveform display.

5. Apparatus in accordance with claim 4 wherein the first and second-named square wave developing means are respectively triggered by respective oppositely-phased square waves having a frequency corresponding to one-half the field frequency of said PAL signals; and wherein said apparatus includes means for developing said half-field frequency waves under the control of field frequency waves derived from the synchronizing components of said PAL signals.

6. Apparatus in accordance with claim 5 wherein said manual selection means includes means for optionally controlling the actuation of said trigger pulse generator in accordance with said field frequency waves, and wherein said apparatus also includes:

means for combining said half field frequency waves with one of the square waves of said first and second pair to develop a stairstep wave; and means for adding said stairstep wave to the PAL signals subject to display in the circumstance of field frequency wave control of said trigger pulse generator.